US008395966B2

(12) United States Patent
Moore et al.

(10) Patent No.: US 8,395,966 B2
(45) Date of Patent: Mar. 12, 2013

(54) SEPARATING SEISMIC SIGNALS PRODUCED BY INTERFERING SEISMIC SOURCES

(75) Inventors: Ian Moore, Cambridge (GB); Craig J. Beasley, Houston, TX (US); William H. Dragoset, Jr., Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 593 days.

(21) Appl. No.: 12/429,328

(22) Filed: Apr. 24, 2009

(65) Prior Publication Data
US 2010/0271904 A1    Oct. 28, 2010

(51) Int. Cl.
G01V 1/36    (2006.01)
G01V 1/16    (2006.01)

(52) U.S. Cl. .......................................... 367/38; 367/37
(58) Field of Classification Search .................... 367/37, 367/38
See application file for complete search history.

(56) References Cited

U.S. PATENT DOCUMENTS

| 3,984,805 | A |   | 10/1976 | Silverman |
|---|---|---|---|---|
| 4,170,002 | A |   | 10/1979 | Strange |
| 4,534,019 | A |   | 8/1985 | Wiggins et al. |
| 4,648,039 | A |   | 3/1987 | Devaney et al. |
| 4,953,657 | A |   | 9/1990 | Edington |
| 5,703,833 | A |   | 12/1997 | Allen |
| 5,719,821 | A | * | 2/1998 | Sallas et al. ........................ 367/41 |
| 5,761,152 | A |   | 6/1998 | Jacobsen et al. |
| 5,924,049 | A |   | 7/1999 | Beasley et al. |
| 6,545,944 | B2 |   | 4/2003 | de Kok |
| 6,691,039 | B1 |   | 2/2004 | Wood |
| 6,763,304 | B2 |   | 7/2004 | Schonewille |
| 6,766,256 | B2 | * | 7/2004 | Jeffryes ........................... 702/17 |
| 6,789,018 | B1 |   | 9/2004 | Khan |
| 6,865,489 | B2 |   | 3/2005 | Jing |
| 6,882,938 | B2 |   | 4/2005 | Vaage et al. |
| 6,906,981 | B2 |   | 6/2005 | Vaage |
| 7,050,356 | B2 |   | 5/2006 | Jeffryes |
| 7,295,490 | B1 |   | 11/2007 | Chiu et al. |
| 7,388,811 | B2 | * | 6/2008 | Meunier et al. ................ 367/189 |
| 7,916,576 | B2 |   | 3/2011 | Beasley et al. |
| 8,000,168 | B2 |   | 8/2011 | Eick et al. |
| 2002/0181328 | A1 |   | 12/2002 | de Kok |
| 2004/0013036 | A1 |   | 1/2004 | Fageras et al. |
| 2004/0013037 | A1 |   | 1/2004 | Vaage |
| 2005/0027454 | A1 |   | 2/2005 | Vaage et al. |
| 2005/0128874 | A1 |   | 6/2005 | Herkenhoff |

(Continued)

FOREIGN PATENT DOCUMENTS

EP    0296041 A1    12/1988
WO    02097474 A1    12/2002

OTHER PUBLICATIONS

Beasley, et al, A New Look at Simultaneous Sources, 1998 SEG Expanded Abstracts, 1998.

(Continued)

*Primary Examiner* — Eric Bolda

(57) ABSTRACT

A technique includes obtaining seismic data acquired by seismic sensors of a composite seismic signal that is produced by the firings of multiple seismic sources. The technique includes modeling the seismic data as being a function of models for the sources and linear operators and defining desired constraints on the models. The technique includes simultaneously determining the models based on the modeling and the desired constraints. The datasets are generated based on the determined models. Each dataset is indicative of a component of the composite seismic signal and is attributable to a different one of the seismic sources.

20 Claims, 13 Drawing Sheets

U.S. PATENT DOCUMENTS

| | | | |
|---|---|---|---|
| 2006/0164916 | A1 | 7/2006 | Krohn et al. |
| 2007/0091719 | A1 | 4/2007 | Falkenberg et al. |
| 2007/0274155 | A1 | 11/2007 | Ikelle |
| 2008/0019215 | A1 | 1/2008 | Robertsson et al. |
| 2008/0033655 | A1 | 2/2008 | Ozbek et al. |
| 2008/0205193 | A1 * | 8/2008 | Krohn et al. ............ 367/38 |
| 2008/0316860 | A1 | 12/2008 | Muyzert et al. |
| 2009/0168600 | A1 | 7/2009 | Moore et al. |
| 2009/0210158 | A1 | 8/2009 | German |
| 2010/0020641 | A1 | 1/2010 | Eick et al. |

OTHER PUBLICATIONS

Manin, et al., Industrial and Seismic Noise Removal in Marine Processing, EAEG 55th Meeting and Technical Meeting, 1993.

Lynn, Experimental Investigation of Interference from Other Seismic Crews, Geophysics 198611, p. 1501-1524.

International Search Report, 20101019, PCT/US2010/027954, 53.0112-PCT.

International Search Report and Written Opinion of PCT Application No. PCT/US2008/084442, dated Jul. 23, 2009: pp. 1-15.

International Search Report and Written Opinion of PCT Application No. PCT/US2009/050554, dated Jan. 29, 2010: pp. 1-13.

Office Action of Chinese Patent Application Serial No. 200880125359.4, dated Feb. 16, 2012: pp. 1-6.

Hampson et al., "Acquisition using simultaneous sources," SEG Las Vegas 2008 Annual Meeting, 2008: pp. 2816-2820.

Akerberg et al., "Simultaneous source separation by sparce Radon transform," SEG Las Vegas 2008 Annual Meeting, 2008: pp. 2801-2805.

Moore et al., "Simultaneous source separation using dithered sources," SEG Las Vegas 2008 Annual Meeting, 2008: pp. 2806-2810.

De Kok et al., "A-04: A Universal Simultaneous Shooting Technique," EAGE 64th Conference & Exhibition, May 27-30, 2002: pp. 1-4.

\* cited by examiner

SEPARATING SEISMIC SIGNALS PRODUCED BY INTERFERING SEISMIC SOURCES

BACKGROUND

The invention generally relates to separating seismic signals produced by interfering seismic sources.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining seismic data acquired by seismic sensors of a composite seismic signal that is produced by the firings of multiple seismic sources. The technique includes modeling the seismic data as being a function of models for the sources and linear operators and defining desired constraints on the models. The technique includes simultaneously determining the models based on the modeling and the desired constraints; and based on the determined models, generating datasets. Each dataset is indicative of a component of the composite seismic signal and is attributable to a different one of the seismic sources.

In another embodiment of the invention, a technique includes obtaining seismic data acquired by seismic sensors of a composite seismic signal produced by the firings of multiple seismic sources. The source model includes models for a plurality of data gathers. The technique includes modeling the seismic data as being a function of models of the sources and linear operators and for each source, determining desired constraints for the plurality of data gathers relative to each other. The technique includes simultaneously determining the models based on the modeling and the desired constraints; and based on the determined models, generating datasets. Each dataset is indicative of a component of the composite seismic signal and is attributable to a different one of the seismic sources.

In yet another embodiment of the invention, a technique includes determining at least one characterizing parameter of a seismic survey in which multiple seismic sources are fired and seismic sensors sense energy produced by the seismic sources. The determination includes optimizing the seismic survey for separation of the sensed energy according to the seismic sources based at least in part on an inseparability measure determined at least in part on a first modeling operator applied to derive an estimate of the energy sensed by the seismic sensors and a second modeling operator applied to separate seismic data acquired by the sensors according to the seismic sources.

Advantages and other features of the invention will become apparent from the following drawing, description and claims.

DETAILED DESCRIPTION

Figure 1:
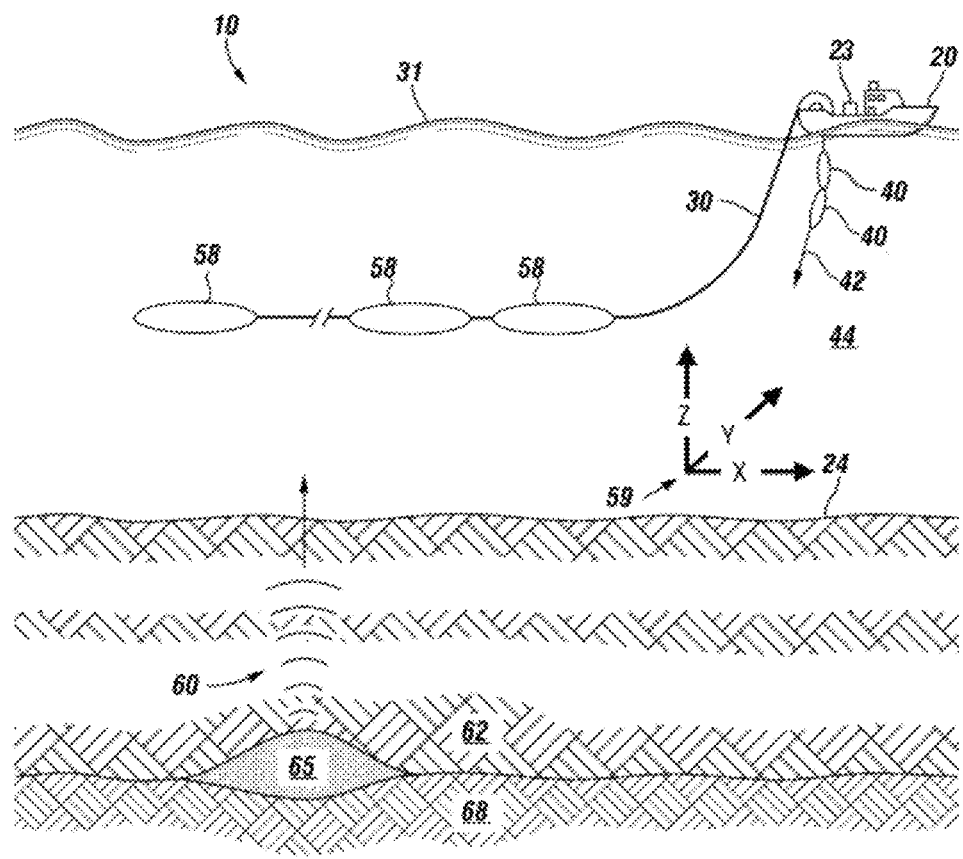
FIG. 1 is a schematic diagram of a marine-based seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. It is noted that the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensors 58, which may be, depending on the particular embodiment of the invention, hydrophones (as one non-limiting example) to acquire pressure data or multi-component sensors. For embodiments of the invention in which the sensors 58 are multi-component sensors (as another non-limiting example), each sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular multi-component seismic sensor may include a hydrophone for measuring pressure and three orthogonally-aligned accelerometers to measure three corresponding orthogonal components of particle velocity and/or acceleration near the sensor. It is noted that the multi-component seismic sensor may be implemented as a single device (as depicted in FIG. 1) or may be implemented as a plurality of devices, depending on the particular embodiment of the invention. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure gradient of the pressure wavefield with respect to the inline direction.

The marine seismic data acquisition system 10 includes one or more seismic sources 40 (two exemplary seismic sources 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are generated by the sources 40 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor 58 may provide a trace, which corresponds to a measure of a pressure wavefield by its hydrophone; and the sensor 58 may provide (depending on the particular embodiment of the invention) one or more traces that correspond to one or more components of particle motion.

Figure 19:
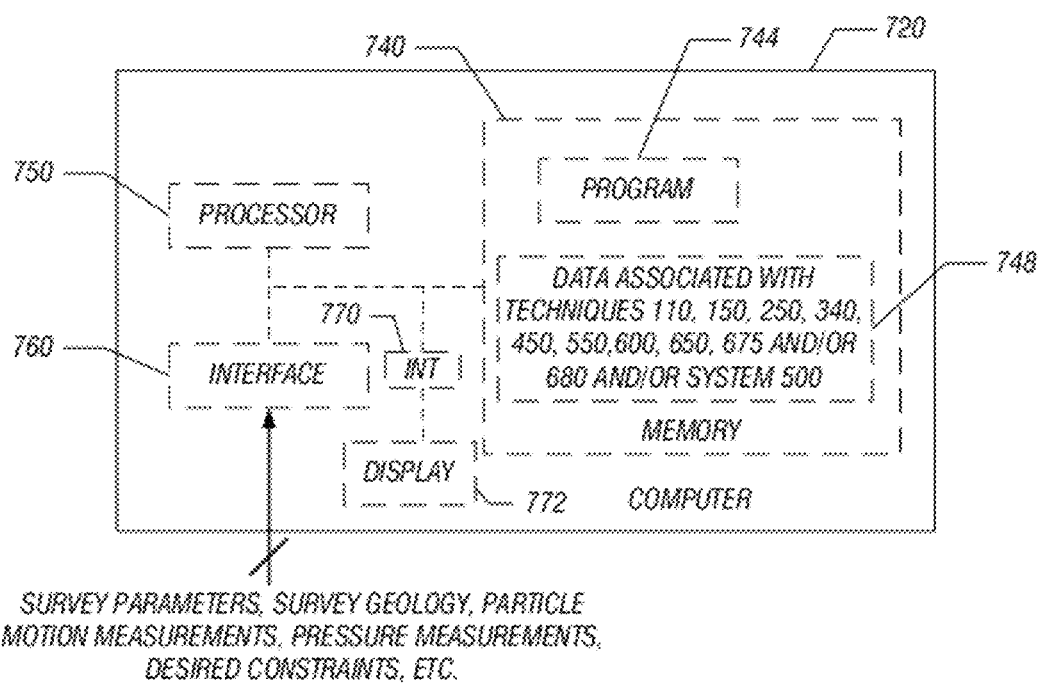
FIG. 19 is a schematic diagram of a data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 720 that is depicted in FIG. 19 and is further described below) that may be, for example, located on land or on the vessel 20. Thus, many variations are possible and are within the scope of the appended claims.

A particular seismic source 40 may be formed from an array of seismic source elements (such as air guns, for example) that may be arranged in strings (gun strings, for example) of the array. Alternatively, a particular seismic source 40 may be formed from one or a predetermined number of air guns of an array, may be formed from multiple arrays, etc. Regardless of the particular composition of the seismic sources, the sources may be fired in a particular time sequence during the survey.

As described in more detail below, the seismic sources 40 may be fired in a sequence such that multiple seismic sources 40 may be fired simultaneously or near simultaneously in a short interval of time so that a composite energy signal that is sensed by the seismic sensors 58 contain a significant amount of energy from more than one seismic source 40. In other words, the seismic sources interfere with each other such that the composite energy signal is not easily separable into signals that are attributed to the specific sources. The data that is acquired by the seismic sensors 58 is separated, as described below, into datasets that are each associated with one of the seismic sources 40 so that each dataset indicates the component of the composite seismic energy signal that is attributable to the associated seismic source 40.

In a conventional towed marine survey, a delay is introduced between the firing of one seismic source and the firing of the next seismic source, and the delay is sufficient to permit the energy that is created by the firing of one seismic source to decay to an acceptable level before the energy that is associated with the next seismic source firing arrives. The use of such delays, however, imposes constraints on the rate at which the seismic data may be acquired. For a towed marine survey, these delays also imply a minimum inline shot interval because the minimum speed of the survey vessel is limited.

Thus, the use of simultaneously-fired or near-simultaneously-fired seismic sources in which signals from the sources interfere for at least part of each record, has benefits in terms of acquisition efficiency and inline source sampling. For this technique to be used in conjunction with conventional data processing methods, the acquired data should ideally be separated into the datasets that are each uniquely associated with one of the seismic sources.

One conventional technique for enabling the separation for interfering seismic sources makes use of relatively small delays (random delays, for example) between the firings of seismic sources (i.e., involves the use of source dithering). The resulting seismic traces are collected into a domain that includes many firings of each source. The traces are aligned such that time zero corresponds to the firing time for a specific source so that the signal acquired due to the specific seismic source appears coherent while the signal acquired due to the other seismic sources appear incoherent. The acquired signals are separated based on coherency.

It has been observed that the apparently incoherent signal may not be mathematically incoherent, because the time delays between seismic source firings that make the signal appear to be incoherent are known. Therefore, in accordance with embodiments of the invention described herein, all of the energy that is acquired due to interfering seismic source firings is treated as a single composite energy signal; and linear operator transforms are used for purposes of decomposing the composite energy signal into signals that are each uniquely associated with a particular seismic source.

Figure 2:
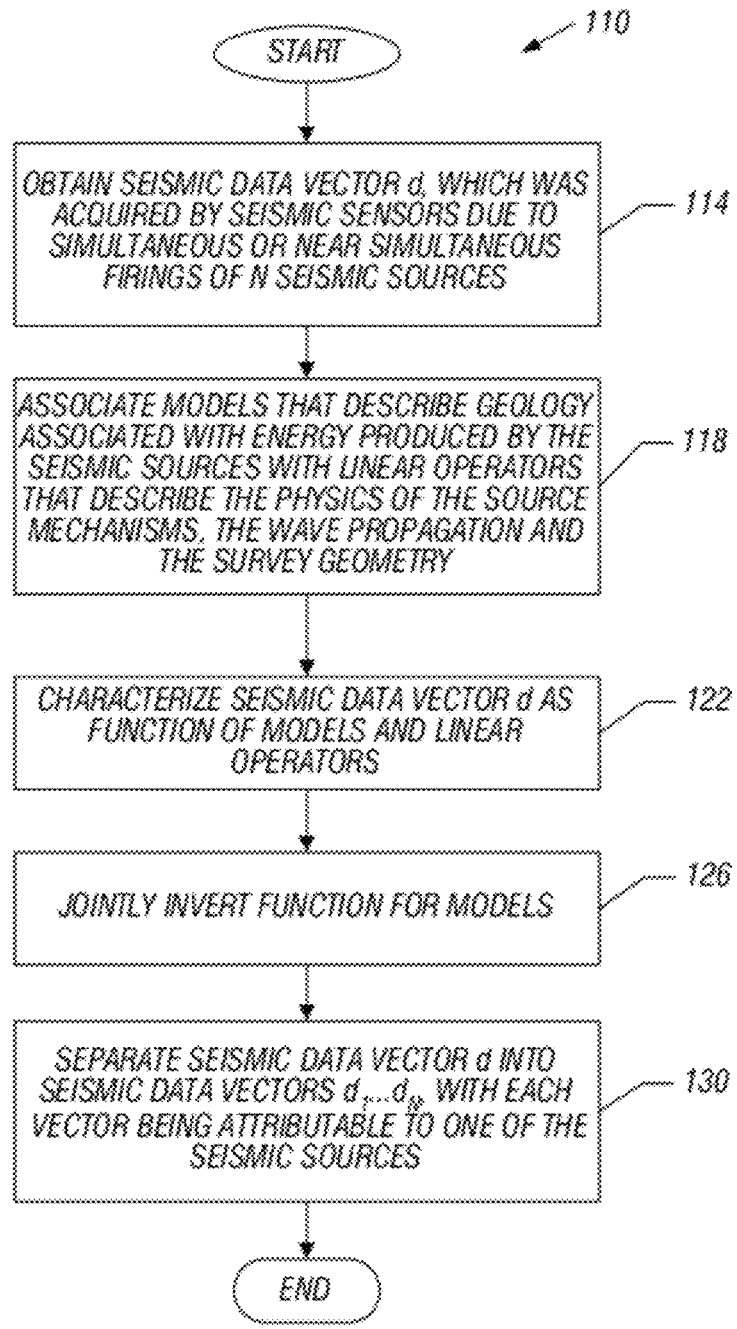
FIGS. 2, 3 and 11 are flow diagrams depicting techniques to separate seismic signals produced by interfering seismic sources according to embodiments of the invention.

More specifically, FIG. 2 depicts a technique 110 that may be generally used for purposes of separating seismic sensor data that was acquired due to the firings of interfering seismic sources. Referring to FIG. 2, the technique 110 includes obtaining (block 114) seismic data (referred to as a "seismic data vector d"), which consists of the collection of traces that was acquired by the seismic sensors due to the many firings of N (i.e., multiple) seismic sources. Thus, the seismic sources were fired simultaneously or in a near simultaneous manner such that significant energy from all of these firings are present in the seismic data vector d. Pursuant to block 118, models, which describe the geology that affects the source energy are associated with linear operators, which describe the physics of the source mechanisms, the wave propagation and the survey geometry. The seismic data vector d is characterized (block 122) as a function of the models and the linear operators. This function is then jointly inverted (block 126) for the models, which permits the seismic data vector d to be separated (block 130) into N seismic datasets $d_1 \ldots d_N$ such that each dataset is uniquely attributable to one of the seismic sources. In other words each dataset represents a component of the sensed composite energy signal, which is uniquely attributable to one of the seismic sources.

As a more specific example, assume that the seismic data vector d is acquired due to the near simultaneous firing of two seismic sources called "$S_1$" and "$S_2$." For this example, the seismic sources S1 and S2 are fired pursuant to a timing sequence, which may be based on a predetermined timing pattern or may be based on random or pseudo-random times. Regardless of the particular timing scheme, it is assumed for this example that the seismic source $S_1$ is fired before the seismic source $S_2$ for all traces, and it is further assumed that the zero times of the traces correspond to the firing times for $S_1$. Thus, the zero times of the traces are in "$S_1$ time." The offsets, or vectors, to the seismic sources $S_1$ and $S_2$ are called "$x^1$" and "$x^2$," respectively. The timing delays, denoted by "t" for the seismic source $S_2$ are known for each trace.

It is assumed for this example that the collection of traces are such that the values of t are random. In practice, this is the case for a CMP, receiver or common offset gather. For purposes of simplifying this discussion, it is assumed that the traces in each gather may be located with respect to the seismic source $S_1$ and seismic source $S_2$ using scalar quantities called "$x^1_i$" and "$x^2_i$," respectively. In this notation, the subscript "i" denotes the trace number in the gather. As a more specific example, for a CMP gather, "$^1_i$" may be the scalar offset to the seismic source $S_1$, and these quantities are referred to as offsets below. Similarly, "$t_i$" denotes the timing delay for the $i^{th}$ trace.

The recorded energy for the seismic source $S_1$ may be modeled by applying a linear operator called "$L_1$" (which represents the physics of the seismic source $S_1$, the wave propagation associated with the source $S_1$ and the survey geometry associated with the seismic source $S_1$) to an unknown model called "$m_1$," which describes the geology that affects the energy that propagates from the seismic source $S_1$. The model m1 contains one element for each parameter in the model space. Typically the model space may be parameterized by slowness or its square, corresponding to linear or hyperbolic/parabolic Radon transforms, respectively. The linear operator $L_1$ is a function of the offsets to the source $S_1$ the parameters that characterize the model space, and time or frequency. A seismic data vector $d_1$ contains one element for each trace (at each time or frequency) and is the component of the seismic data d, which is associated with the seismic source $S_1$. In other words, the seismic data vector $d_1$ represents the dataset attributable to the seismic source $S_1$. The seismic data vector $d_1$ may be described as follows:

$$d_1 = L_1 m_1. \qquad \text{Eq. 1}$$

The energy that is associated with the seismic source $S_2$ appears incoherent in the seismic data vector d. However, the energy is related to a coherent dataset in which the firing times for the seismic source $S_2$ are at time zero (i.e., seismic source $S_2$ time) by the application of time shifts $t_i$ to the traces. A diagonal linear operator called "$D_2$" may be used for purposes of describing these time shifts, such that the component of the seismic data vector d, which is associated with the seismic source $S_2$ and which is called "$d_2$" may be described as follows:

$$d_2 = L_2 m_2. \qquad \text{Eq. 2}$$

In Eq. 2, a linear operator called "$L_2$" represents the physics of the seismic source $S_2$ and the time shifts, the wave propagation associated with the seismic source $S_2$ and the survey geometry associated with the seismic source $S_2$. Also in Eq. 2, a model called "$m_2$" describes the geology that affects the energy that propagates from the seismic source $S_2$. The $L_2$ operator may be alternatively described as "$L_2 = D_2 L_2'$," where "$L_2'$" represents the physics of the seismic source $S_2$, and "$D_2$" represents the time shifts, as described above. Using this same notation, "$L_1 = D_1 L_1' = L_1'$," due to $D_1$ being equal to "I," the identity matrix.

The composite seismic energy signal that is recorded by the seismic sensors is attributable to both seismic sources $S_1$ and $S_2$. Thus, the seismic data vector (i.e., the recorded data), called "$d_t$" herein, is a combination of the seismic data vectors $d_1$ and $d_2$, as described below:

$$d_t = d_1 + d_2. \qquad \text{Eq. 3}$$

Due to the relationships in Eqs. 1, 2 and 3, the seismic data vector $d_t$ may be represented as the following linear system:

$$d_t = [L_1 \ L_2] \begin{bmatrix} m_1 \\ m_2 \end{bmatrix}, \text{ or in a more compact form:} \qquad \text{Eq. 4}$$

$$d_t = L_t m, \qquad \text{Eq. 5}$$

where "$L_t$" is "$[L_1 \ L_2]$."

Thus, Eq. 5 may be solved (i.e., jointly inverted) for the model vector m (i.e., ($m_1$; $m_2$)) using standard techniques, such as the least squares algorithm; and after the model vector m is known, Eqs. 1 and 2 may be applied with the models $m_1$ and $m_2$ for purposes of separating the seismic data vector $d_t$ into the seismic data vectors $d_1$ and $d_2$, i.e., into the datasets that indicate the measurements attributable to each seismic source.

Figure 3:
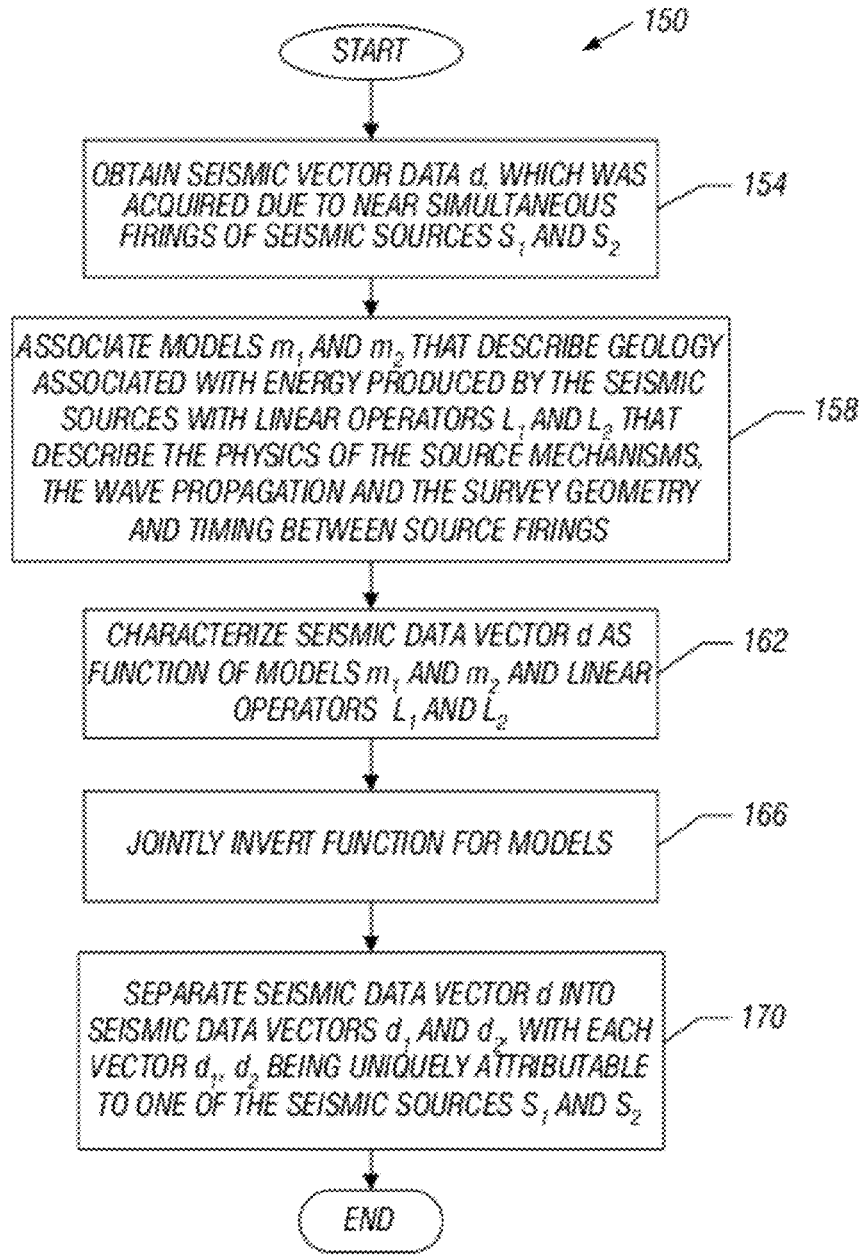

Thus, referring to FIG. 3, in accordance with some embodiments of the invention, a technique 150 may be used for separating seismic data that is produced by interfering seismic sources (two seismic sources for this example). Pursuant to the technique 150, seismic data vector $d_t$ is obtained, which was acquired due to the near simultaneous firings of seismic sources, pursuant to block 154. Pursuant to block 158, models $m_1$ and $m_2$ are associated with linear operators $L_1$ and $L_2$ that describe the physics of the source mechanisms, the wave preparation and survey geometry and the timing between the source firings. The seismic data vector $d_t$ is then characterized (block 162) as a function of the models $m_1$ and $m_2$ and the linear operators $L_1$ and $L_2$. The function is then jointly inverted, pursuant to block 166, for the models $m_1$ and $m_2$; and then, the seismic data vector $d_t$ may be separated into the seismic data vectors $d_1$ and $d_2$, pursuant to block 170.

Eq. 4 may be inverted in the frequency ($\omega$) domain. In that case, $(D_2)_{jk} = \exp(-i\omega t_j)\delta_{jk}$ and $(L'_s)_{jk} = \exp(-i\omega t^s_{jk})$, where $t^s_{jk}$ is the time shift associated with offset $s^s_j$ and the parameter for the $k^{th}$ trace in the model space associated with $S_s$; and $L_s = D_s L_s'$ for all sources, where $D_1 = I$ (the identity matrix), such that $L_1 = L_1'$. For a linear Radon transform parameterized by slowness, $p^s_k$, $t^s_{jk} = x^s_j p^s_k$. For a parabolic Radon transform parameterized by curvature, $q^s_k$, $t^s_{jk} = (x^s_j)^2 q^s_k$.

The success of the source separation technique described above depends on the ability of the transform to separate the energy associated with the two sources. Unlike most applications of Radon transforms, success does not depend on the ability to focus energy at the correct model parameter within $m_1$ or $m_2$. When random or pseudo random time delays are used between source firings, the basis functions for the two model domains ($t^1_{jk}$ and $t_j + t^2_{jk}$) are very different, and this enables extremely effective separation of the sources.

Details of the parameterization of the model domain are not important, provided it is possible to model the recorded data using that domain. For example, for a linear Radon transform, the slowness range must cover the range observed in the data, and the sampling must be adequate to avoid aliasing. The use of high-resolution transforms to improve focusing is not expected to be necessary in general. However, high-resolution transforms can be used if required, for instance because of poor sampling in offset created by offset windowing or acquisition geometry issues.

FIGS. 5, 6, 7, 8, 9 and 10 depict examples of the technique 150 when applied to a simple, synthetic dataset. Input signals 200 (see FIG. 4) to the separation process (i.e., the simulated signals recorded by the seismic sensors) are formed by adding synthetic signals 206 (see FIG. 5) and 210, which corresponding to the seismic sources $S_1$ and $S_2$, respectively. The input signals 200 also contain random noise, and the signals 200 are in $S_1$ time. The signals 206 contain 10 hyperbolic events with random zero-offset times, amplitudes and velocities and a 30 Hz Ricker wavelet. The input signals 200 correspond to input signals 214 in FIG. 7 for $S_2$ time. As can be seen from FIG. 7, the removal of the time delays makes the $S_2$-related signals 214 coherent.

Figure 4:
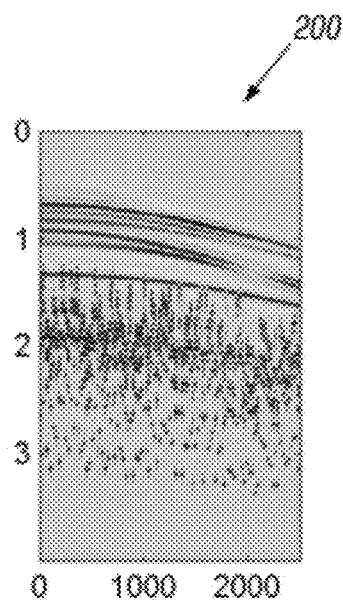
FIGS. 4, 5, 6, 7, 8, 9 and 10 are simulated source and receiver signals illustrating separation of a composite seismic signal into signals identifiable with the originating sources according to an embodiment of the invention.
Figure 5:
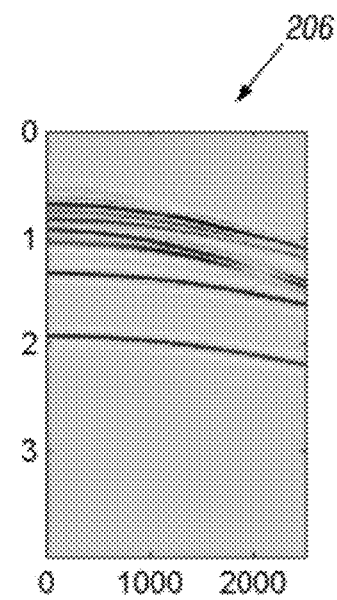
Figure 6:
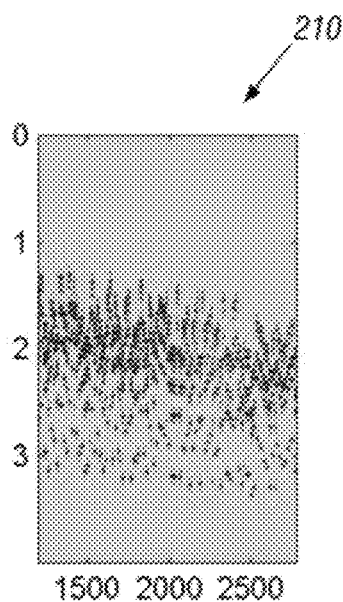
Figure 7:
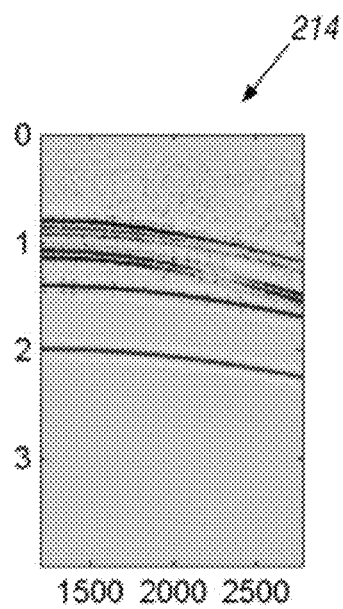
Figure 8:
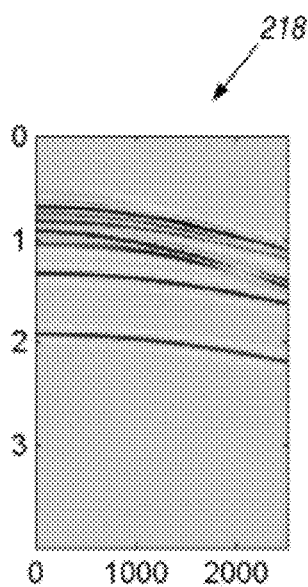
Figure 9:
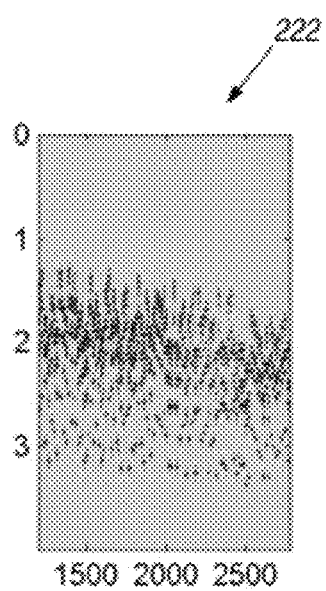
Figure 10:
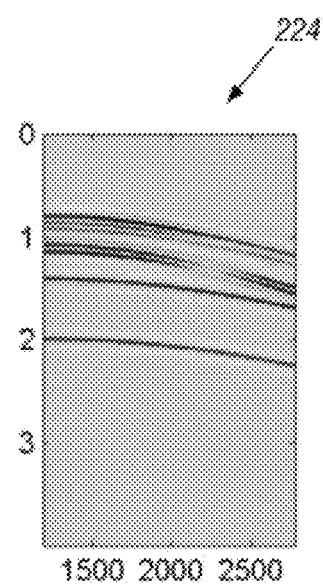

The separation process is directed at recovering the $S_1$ input signals 206 (FIG. 5) and $S_2$ input signals 210 (FIG. 6) from the acquired input signals 200 (FIG. 4). The resulting estimates are depicted in FIGS. 8 (separated $S_1$ signals 218) and 9 (separated $S_2$ signals 222), respectively. Nearly all of the energy in the input signals 200 appears in either the signals 218 or the signals 222. The $S_2$-related data may be made coherent by time-shifting to $S_2$-time, as shown by signals 224 of FIG. 10. The output data (i.e., signals 218 and 224) may then be processed in a conventional seismic data processing flow, using offsets to $S_1$ and $S_2$, respectively.

Although the examples that are described above use source dithering, or non-simultaneous firing of the seismic sources, the seismic sources may be fired simultaneously, in accordance with other embodiments of the invention. In this regard, if the linear operators are made more unique predictors of the seismic data, then the requirement for the dithering of the source firings becomes less important. In other words, source dithering may be less important if there is less overlap of the basis functions for the seismic source locations.

As a more specific example, the techniques that are described herein may be combined with other techniques for source separation for purposes of causing the linear operators to be more unique predictors of the seismic data. For example, some parts of the wavefields (such as the direct arrivals, for example) may be estimated deterministically and subtracted as a pre-processing step. In addition, methods such as dip-filtering may be used in combination with the techniques that are described herein.

As a more specific example, the energy that is recorded from the seismic source $S_1$ may be viewed as a combination of energy produced by direct arrivals and energy that is produced by reflections. As such, the seismic data vector $d_1$ may be effectively represented as follows:

$$d_1 = d_{1f} + d_{1h} = L_1 m_f + H_1 m_h, \qquad \text{Eq. 6}$$

where "$d_{1f}$" represents the seismic data attributable to direct arrivals from the seismic source $S_1$; "$d_{1h}$" represents the seismic data attributable to reflections produced due to the seismic source $S_1$; "$L_1$" represents a linear Radon operator associated with the direct arrivals from the seismic source $S_1$; "$m_f$" represents a model describing the geology that affects the direct arrivals; "$H_1$" represents a hyperbolic Radon transform operator associated with the reflections produced due to energy from the seismic source $S_1$; and "$m_h$" represents a model that describes the geology that affects the reflections produced by the seismic sources.

Similarly, the seismic data vector, which is $d_2$ attributable to energy that is recorded from the seismic source $S_2$, may be described as follows:

$$d_2 = d_{2f} + d_{2h} = L_2 m_f + H_2 m_h, \qquad \text{Eq. 7}$$

where "$d_{2f}$" represents the component of the seismic data vector $d_2$ attributable to direct arrivals; "$d_{2h}$" represents the seismic data $d_2$ attributable to reflections; "$L_2$" represents a linear Radon transform operator associated with the direct arrivals from the seismic source $S_2$; and "$H_2$" represents the hyperbolic Radon transform associated with the reflections produced due to the energy from the seismic source $S_2$.

Due to the relationships that are set forth in Eqs. 6 and 7, the seismic data vector $d_t$, which represents the actual data recorded by the seismic sensors, may be represented as follows:

$$d_t = d_{1f} + d_{1h} + d_{2f} + d_{2h}. \qquad \text{Eq. 8}$$

Thus, the seismic data vector $d_t$ may be represented by the following function, which may be inverted for the models $m_l$ and $m_h$:

$$d_t = [(L_1 + L_2) \ (H_1 + H_2)] \begin{bmatrix} m_l \\ m_h \end{bmatrix}. \qquad \text{Eq. 9}$$

Eqs. 6 and 7 may then be applied to derive the data vectors $d_1$ and $d_2$.

Although linear and hyperbolic Radon transforms have been described above, it is noted that other linear operators may be used, in accordance with other embodiments of the invention. For example, parabolic or migration operators may be used in accordance with other embodiments of the invention, as just a few other non-limiting examples.

Figure 11:
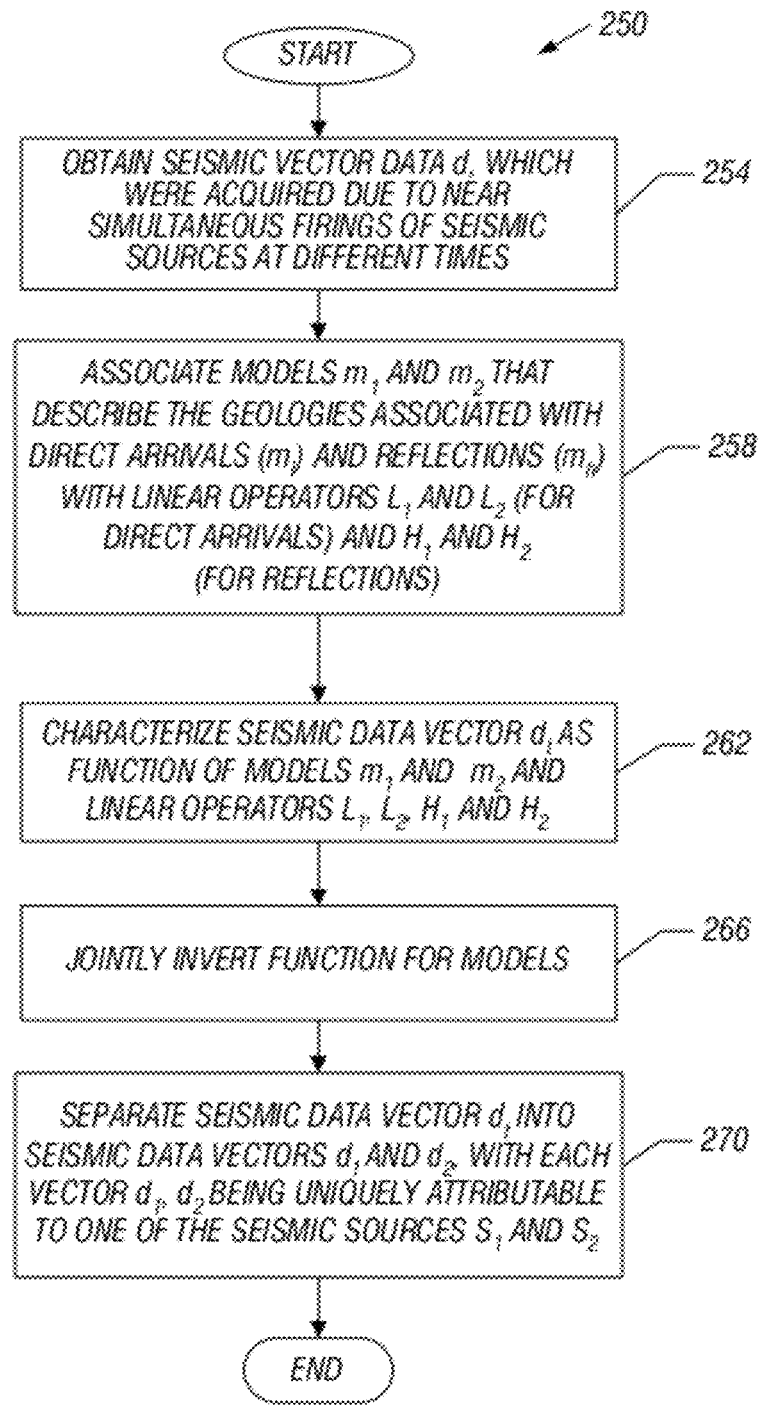

Thus, referring to FIG. 11, a technique 250 may be used in accordance with some embodiments of the invention for purposes of separating seismic data acquired due to energy that is produced by interfering seismic sources, which are two seismic sources $S_1$ and $S_2$ for this example. Pursuant to the technique 250, a seismic data vector $d_t$ is obtained (block 254), which was acquired due to the firings of the seismic sources. Models that describe geologies associated with the direct arrivals ($m_l$) and the reflections ($m_h$) are associated (block 258) with linear operators $L_1$ and $L_2$ (for direct arrivals) and $H_1$ and $H_2$ (for reflections). Pursuant to block 262, the seismic data vector $d_t$ is characterized as a function of models $m_l$ and $m_h$ and linear operators, $L_1$, $L_2$, $H_1$ and $H_2$. The function is then jointly inverted, pursuant to block 266, for the models $m_1$ and $m_h$. Subsequently, the seismic data vector $d_t$ may be separated, pursuant to block 270, into the data subset vectors $d_1$ and $d_2$.

Although the example that is set forth herein is for two seismic sources $S_1$ and $S_2$, the techniques may be extended to more than two sources.

Figure 12:
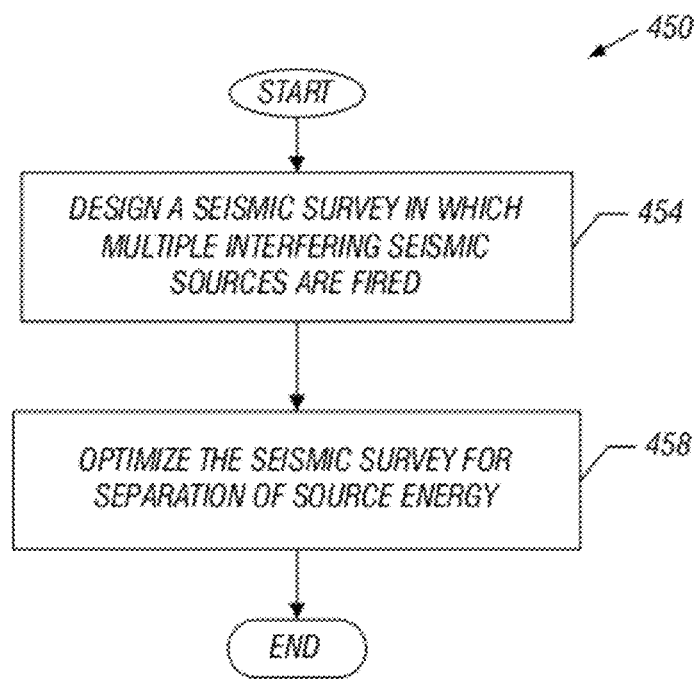
FIGS. 12, 13, 14 and 15 are flow diagrams depicting techniques to design a seismic survey according to embodiments of the invention.

The seismic survey has a number of characterizing parameters, which affect the quality of the source separation. More specifically, such parameters as the timing sequence that governs the seismic source firings, the source geometry (crossline and inline separations of air guns, for example) and the receiver geometry (the type of spread and the crossline and inline separations of the seismic sensors 58, as examples) may influence how effectively the source energy is separated. In accordance with embodiments of the invention described herein, a technique 450 that is depicted in FIG. 12 is used for purposes of designing a seismic survey. Referring to FIG. 12, pursuant to the technique 450, a seismic survey is designed (block 454) in which multiple interfering seismic sources are fired. The acquired seismic data are processed for purposes of separating the sensed source energy according to the seismic sources. Pursuant to block 458 of the technique 450, the seismic survey is optimized for the separation of the source energy. In other words, the technique 450 includes determining one or more parameters of the survey for the purpose of optimizing source separation.

As further described herein, the optimized survey parameters may be parameters related to the geometry of the seismic sources, such as the number of seismic sources, crossline source spacing, inline source spacing, specific source locations, etc.; the receiver geometry; the times at which the seismic sources are fired relative to each other (i.e., the timing sequence for the source firings); the relationship between the timing sequence of source firings and frequency; etc.

Although a towed marine seismic survey is described herein for purposes of example, it is understood that the techniques and systems that are described herein may be likewise be applied to any other type of survey that has interfering seismic sources, such as non-towed marine surveys, land-based surveys, seabed cable-based surveys, vibroseis surveys, etc. For example, in accordance with other embodiments of the invention, such parameters as source frequencies, source amplitudes and the source firing timing sequence of a vibroseis survey may be optimized for purposes of source separation.

As another example, in accordance with embodiments of the invention, the systems and techniques that are described herein may be applied for purposes of optimizing a borehole survey system in which the seismic sources and/or seismic sensors may be deployed in a wellbore. Thus, many variations are contemplated and are within the scope of the appended claims.

Figure 13:
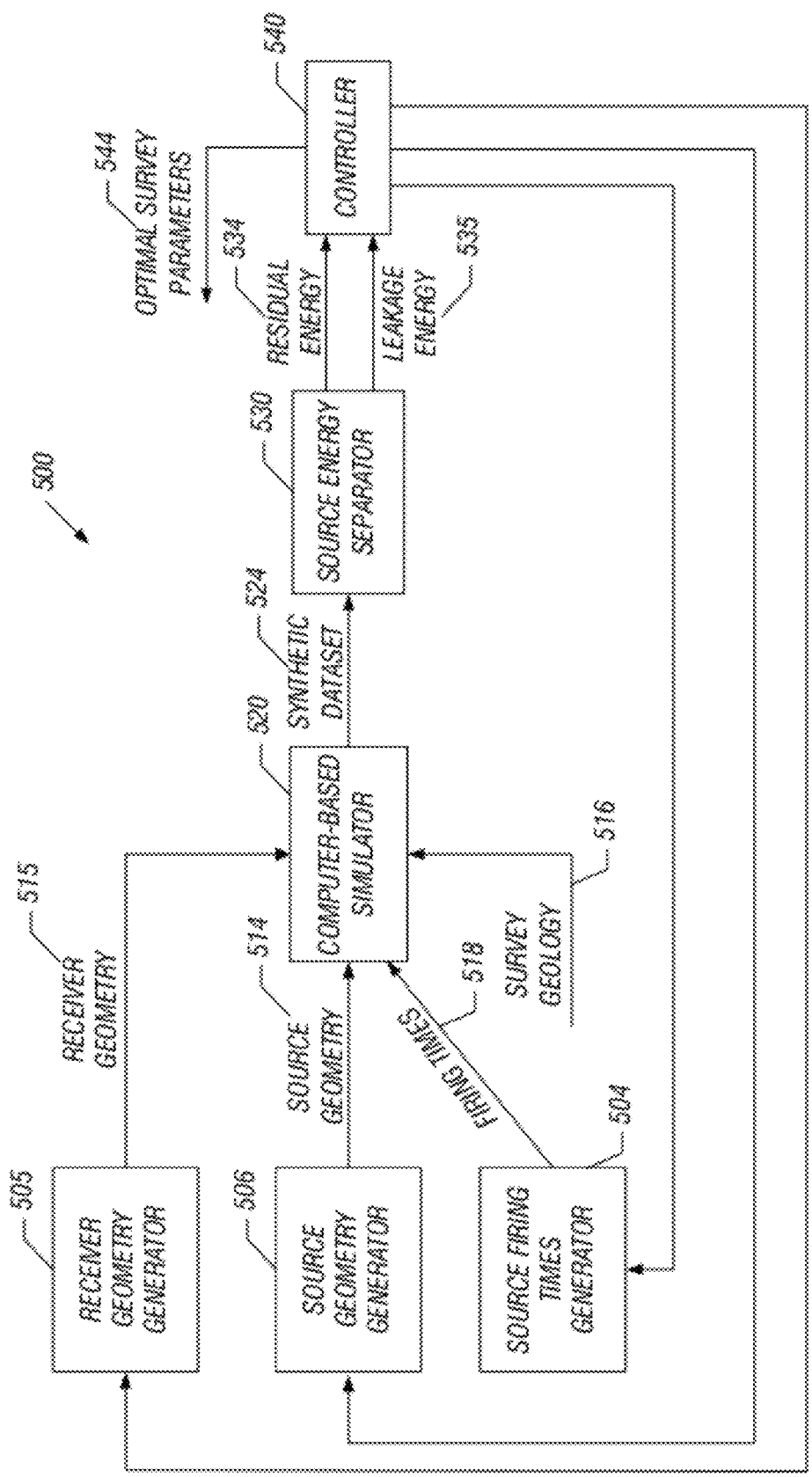

FIG. 13 depicts a system 500 for designing a seismic survey according to some embodiments of the invention. The system 500 may be implemented solely by software executing on one or more processor-based systems, or may be implemented as a combination of software and hardware, depending on the particular embodiment of the invention. The system 500 may be used when the survey geology is known (such as the geology that is known from the results of a prior survey, for example) or at least when a reasonable estimate of the survey geology may be determined. For example, the system 500 may be used, in accordance with some embodiments of the invention, based on a one-dimensional (1-D) estimate, which assumes that the geology only varies in the vertical direction and does not vary in the horizontal direction.

The system 500 includes a computer-based simulator 520 that applies a numerical processing technique for purposes of optimizing survey parameters for source separation. More specifically, in accordance with some embodiments of the invention, the computer-based simulator 520 performs a Monte Carlo simulation, which models the survey system based on randomly or pseudo randomly generated inputs. The simulation and inputs may be, however, subject to various constraints. Therefore, survey parameters, such as firing times, source geometry, receiver geometry (i.e., the geometry of the seismic sensors), etc., may be randomly or pseudo randomly varied within predefined ranges for purposes of determining the optimal survey parameters for source separation.

More specifically, as depicted for purposes of example in FIG. 13, the computer-based simulator 520 may receive data 516, which are indicative of the survey geology, as well as data 514, 515 and 518, which are indicative of the source geometry, receiver geometry and firing times, respectively. It is noted that, depending on the particular embodiment of the invention, the source geometry data 514, receiver geometry data 515 and firing time data 518 may be generated by random, pseudo random or non-random source geometry 506, receiver geometry 505 and source firing time 504 generators, respectively. Thus, the generators 504, 505 and 506 may generate random source geometries, receiver geometries and firing times within predefined ranges, in accordance with some embodiments of the invention.

The manner in which the source geometries, receiver geometries and firing times are generated may be varied, depending on the particular embodiment of the invention. As examples, the source and receiver geometries may be held constant while the optimal firing times are determined; the source geometries, receiver geometries and firing times may simultaneously randomly varied; the firing times and receiver geometries may be held constant while optimal source geometry parameters are determined; etc. Thus, many variations are contemplated and are within the scope of the appended claims.

The computer-based simulator 520 generates a synthetic dataset 524, which is the seismic dataset that is predicted to be acquired by seismic sensors in an actual survey that is defined by the current survey geology and survey parameters that are received as inputs by the computer-based simulator 520. The synthetic dataset 524 indicates the predicted sensed composite energy signal that is produced by the interfering seismic sources 40. Based on the synthetic dataset 524, a source energy separator 530 of the system 500 produces multiple datasets, each of which is attributable to a particular seismic source.

It is noted that the source energy separator 530 may employ a numerical inversion algorithm (performed via instructions executing on a computer), which involves inversion of a linear system (as a non-limiting example). The source energy separation may be unable to attribute all of the energy to one of the seismic sources, which means the processing by the source energy separator 530 produces data 534 that are associated with a residual energy. The source energy separator also produces data 535, which are associated with a leakage energy, i.e., energy that is produced by one seismic source but is attributed to a different seismic source by the separation process. Mathematically, if the recorded data are $d_t = d_1 + d_2$ and the estimated data are $d_1'$ and $d_2'$, then the residual is $d_1' + d_2' - d_t$; and the leakage is $d_1' - d_1$ for seismic source $S_1$, and $d_2' - d_2$ for seismic source $S_2$.

Thus, the residual and leakage energies indicate a degree of error in the source separation, as ideally, the residual and leakage energies are zero. In other words, ideally, all of the sensed energy is partitioned among and correctly to the seismic sources. Therefore, in accordance with some embodiments of the invention, optimization of the seismic survey occurs when the seismic survey is characterized by a set of parameters that minimizes the residual and leakage energies or at least produces residual and leakage energies that are below selected thresholds.

In accordance with embodiments of the invention, a controller 540 of the system 500 receives the following data from the source energy separator 530, the residual energy data 534 and the leakage energy data 535. The controller 540 changes one or more survey parameters (by changing the source firing times or source geometry, as non-limiting examples), until, based on the residual energy data 534 and leakage energy data 535, the controller 540 determines that these energies have been sufficiently minimized. For example, the controller 540 may continue running the receiver geometry 505, source geometry 506 and firing time 504 generators, the controller 540 may change the input ranges, the controller 540 may hold some inputs constant while varying others, etc. Once the controller 540 determines that the residual and leakage energies have been sufficiently minimized, the controller 540 provides data 544, which are indicative of the optimal survey parameters.

Figure 14:
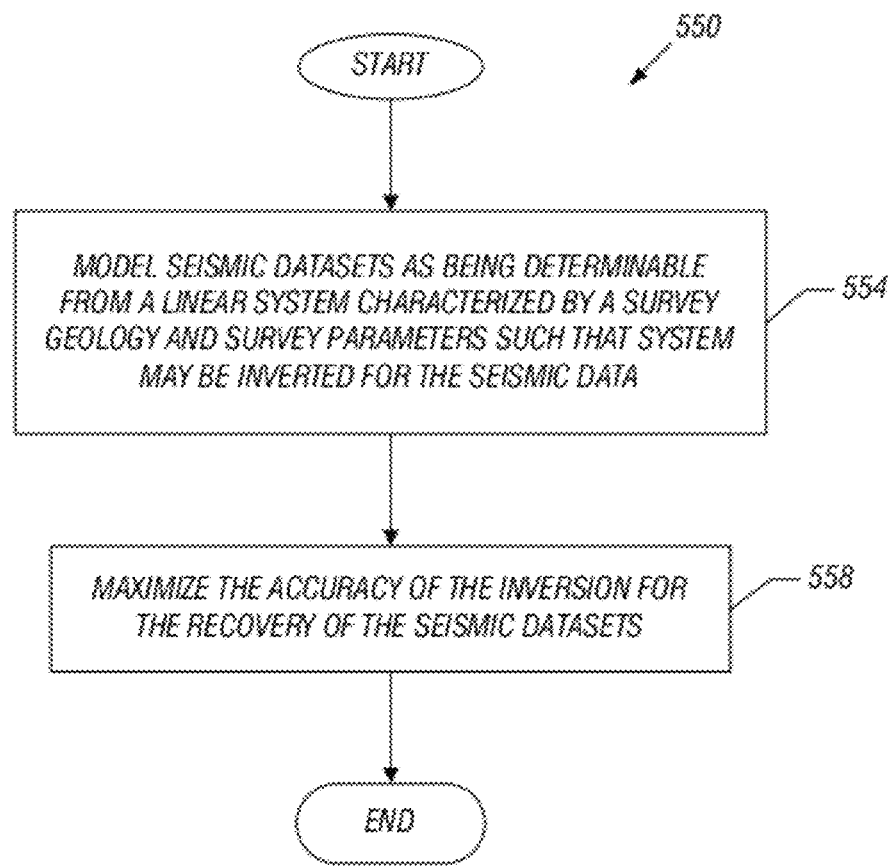

In some cases, the survey geology may be unknown or a reliable estimate of the geology may be unavailable. For such cases, survey parameters may be optimized for source energy separation based on a linear system that characterizes the survey system. As a more specific example, referring to FIG. 14, in accordance with some embodiments of the invention, a technique 550 to optimize survey parameters includes modeling (block 554) seismic datasets as being determinable from a linear system that is characterized by a survey geology and survey parameters. Each dataset is associated with the sensed energy uniquely attributable to a different seismic source. The linear system may be inverted for the seismic datasets. The survey parameters are optimized for source separation by maximizing the accuracy of the inversion for the recovery of the datasets, pursuant to block 558.

As described below, a specific measure of inseparability may be determined, which is data independent. The inseparability measure depends only on the surveyed geometry, source dithers and model parameters. Data independence is quite desirable for survey design, because at that stage, the representative data are not available.

Given $d_t$ and $L_t$, Eq. 5 may be solved in some optimal sense in order to get an estimate (called "$\tilde{m}$" herein) for the unknown model m. The estimated model $\tilde{m}$ is optimal in the sense that it reconstructs the total, recorded data, $d_t$ with minimum error. There are no constraints, however, on the errors in the individual constituent data, $d_1$ and $d_2$, i.e. on the error in separated data d.

Given an estimated model, $\tilde{m}$, the corresponding estimated data may be described as follows:

$$\tilde{d} = L\tilde{m}, \qquad \text{Eq. 10}$$

where "L" maps the model m to the separated data d and is described as follows:

$$L = \begin{bmatrix} L_1 & 0 \\ 0 & L_2 \end{bmatrix}. \qquad \text{Eq. 11}$$

From the point of view of separating $d_1$ from $d_2$, $\tilde{d}$ is required to be equal to d, but $\tilde{m}$ is not required to be equal to m. In other words, it does not matter if the details of the individual models are wrong, provided the separated energy is allocated to the correct model, such that the separated data are correct. In general, in the optimal solution to Eq. 10, $\tilde{m}$ may be described as follows:

$$\tilde{m} = M_t d_t, \text{ and} \qquad \text{Eq. 12}$$

$$\begin{pmatrix} \tilde{m}_1 \\ \tilde{m}_2 \end{pmatrix} = \begin{pmatrix} M_1 \\ M_2 \end{pmatrix} d_t, \qquad \text{Eq. 13}$$

where "$M_t$" represents the generalized inverse of $L_t$. In practice, $M_t$ may not be computed explicitly, but instead Eq. 12 may be solved directly for $\tilde{m}$, generally using an iterative algorithm such as a conjugate gradients (CG) or a least squares (LSQR) algorithm. In general, $M_t$ is only computed explicitly if it is necessary to solve Eq. 12 for many different sets of recorded data ($d_t$), all corresponding to the same operator, $L_t$.

For the purposes of the following discussion, it is assumed that at least an effective $M_t$ is known. Therefore, the estimated data $\tilde{d}$ may be described as follows:

$$\tilde{d} = LM_t d_t. \qquad \text{Eq. 14}$$

Ideally, $M_t$ is chosen such that $\tilde{d} = d$ for all d that fit the model, i.e. for all d in the range of L. This requires the following for all m:

$$Lm = LM_t L_m, \qquad \text{Eq. 15}$$

i.e., $M_t L_t - I$ is in the null space of L.

The least-squares solution for $M_t$, based on minimizing the error in $d_t$ (Eq. 12) is as follows:

$$M_t = (L_t^H L_t)^{-1} L_t. \qquad \text{Eq. 16}$$

If the Hessian, $L_t^H L_t$, is invertible, then $M_t L_t = I$; and the condition for separability is satisfied. This represents the case where a unique model fits the data perfectly, so it is possible to reconstruct not only the total data $d_t$ but also the separated data d with zero error. It is noted that an assumption has been made that the data correspond perfectly to at least one model, so a zero-error model exists even in the over-determined case.

In general, however, the Hessian is not invertible, or at least the Hessian is not numerically invertible. Typically, this is because the model space is larger than the data $d_t$ space, the problem is under-determined, and the solution for m is non-unique. In this case, white noise may be added to the Hessian; or eigenvalue decomposition may be used where small eigenvalues are neglected, in order to find an inverse of the Hessian, and hence to compute $M_t$. In general, this may not lead to an $M_t$ that meets the condition for separability, and thus, may lead to errors in the estimated data $\tilde{d}$.

Ideally, $M_t$ is chosen to maximize source separability. An inseparability matrix E may be defined as follows:

$$E \equiv L(M_t L_t - I) = 0. \qquad \text{Eq. 17}$$

Equating the inseparability matrix E to zero (E=0) corresponds to perfect separability. A scalar measure of inseparability may be defined as follows:

$$\epsilon = \|E\|_2 / \|L\|_2. \qquad \text{Eq. 18}$$

In Eq. 18, the normalizing factor, $\|L\|_2$, corresponds to the worst case, for which $M_t$ is zero. In the case that the Hessian is invertible, then the least-squares solution for $M_t$ provides perfect separability. When the Hessian is not invertible, then $M_t$ is chosen to minimize the inseparability measure $\epsilon$, as this maximizes separability. Alternatively, given $M_t$, the inseparability measure $\epsilon$ may be calculated.

Figure 15:
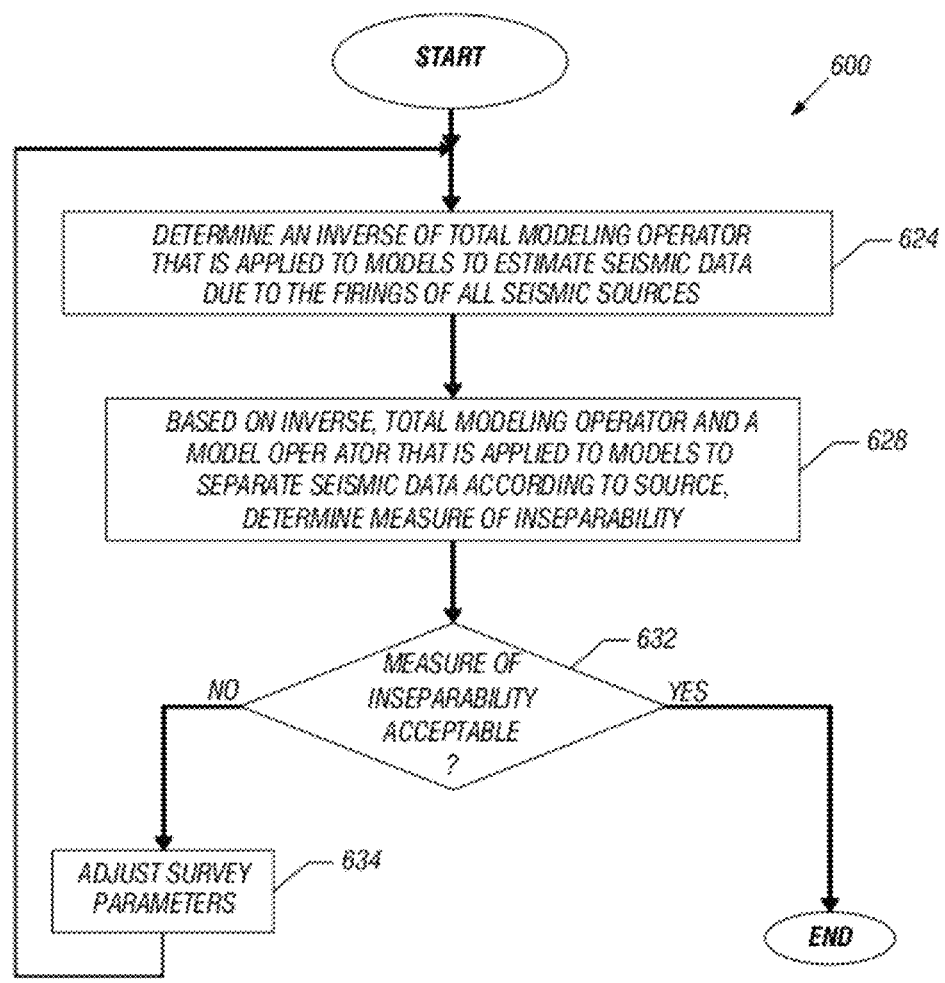

Referring to FIG. 15, to summarize, a technique 600 may be performed in accordance with embodiments of the invention for purposes of designing a seismic survey. Pursuant to the technique 600, an inverse of a total modeling operator that is applied to the models to estimate the total seismic data due to the firings of all of the seismic sources is determined (block 624). A measure of inseparability is determined, pursuant to block 628, based on the inverse of the total modeling operator, the total modeling operator and the modeling operator that is applied to the models to separate seismic data according to source. A determination is then made, pursuant to diamond 632, as to whether the determined measure of inseparability is acceptable. If not, the survey parameters are adjusted (block 634) and control returns to block 624 for another iteration.

A potential limitation of the techniques that are described above is that if the data are sufficiently aliased, then the models for the sources may be underdetermined. In accordance with embodiments of the invention described below, constraints may be added between the models of different source; and/or constraints may be added between different gathers for the same source for purposes of the effects of the aliasing.

Figure 16:
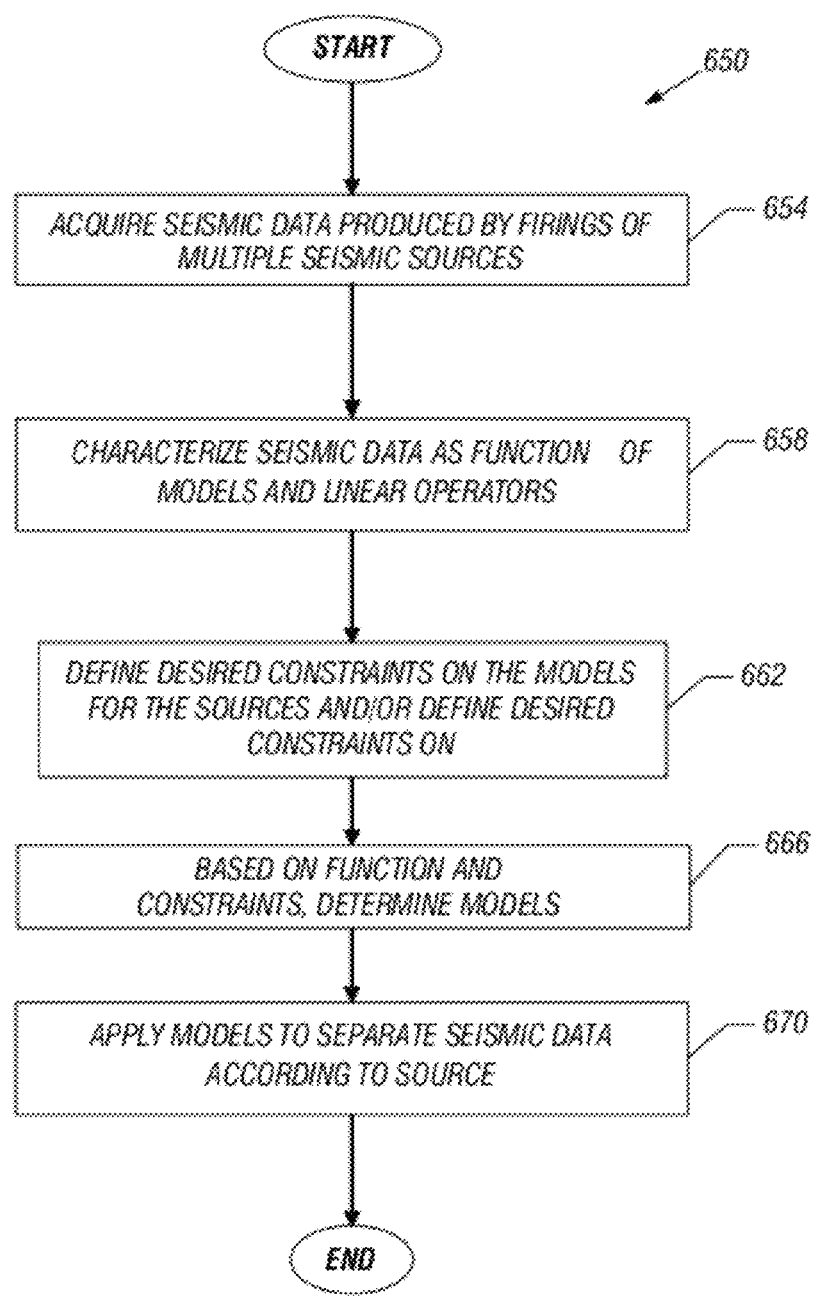
FIGS. 16, 17 and 18 are flow diagrams depicting techniques that use constraints to reduce aliasing effects in simultaneous source separation according to embodiments of the invention.

Referring to FIG. 16, therefore, in accordance with embodiments of the invention, a technique 650 includes acquiring seismic data produced by the firings of multiple seismic sources, pursuant to block 654, and characterizing (block 658) the seismic data as a function of the models and linear operators. The technique 650 further includes, pursuant to block 662, defining desired constraints for the sources and/or defining desired constraints for different gathers for the same source. Based on the function and constraints, the models are determined, pursuant to block 666. The determined models may then be applied, pursuant to block 670, to separate the data according to the source.

One way to constrain the models is to use the same, or common, models. However, in practice, the assumption that the models for each source are precisely equal may likely be poorly met, leading to a large residual of unseparated energy that cannot be modeled. Therefore, in accordance with embodiments of the invention, the models are constrained to be similar, rather than equal, such that the residual is kept relatively small. The components of the data that are consistent with a single model are modeled with such a model, whereas those which require different models can still be modeled. In other words, $m_1 \approx m_2$, or $m_1 = m_2 + \Delta m$, where $\Delta m$ is small. In a least squares sense, the system to be solved may be constrained as follows:

$$\lambda(m_1 - m_2) = 0, \qquad \text{Eq. 19}$$

where "$\lambda$" represents a parameter that controls the relative importance of data fitting and model equality for purposes of the model constraint. The extreme cases of $\lambda = 0$ and $\lambda \to \infty$ correspond to independent models and a single model, respectively.

The inseparability measure used for independent models may be derived from the requirement that the estimated data $\tilde{d}$ is to be equal to the recorded data $d_t$.

Eqs. 5 and 18 may be described in terms of a single linear system, as set forth below:

$$\begin{pmatrix} L_1 & L_2 \\ \lambda I & -\lambda I \end{pmatrix} \begin{pmatrix} m_1 \\ m_2 \end{pmatrix} = \begin{pmatrix} d_t \\ 0 \end{pmatrix}, \qquad \text{Eq. 20}$$

which may be solved to derive an estimate of the model m given the total data, as set forth below:

$$\begin{pmatrix} \tilde{m}_1 \\ \tilde{m}_2 \end{pmatrix} = (M_t \ A) \begin{pmatrix} d_t \\ 0 \end{pmatrix}, \qquad \text{Eq. 21}$$

where the matrix $(M_t \ A)$ represents the generalized inverse of the matrix $$\begin{pmatrix} L_1 & L_2 \\ \lambda I & -\lambda I \end{pmatrix}$$

of Eq. 19. The inseparability measure $\epsilon$ used for independent models is derived from the requirement that the estimated data $\tilde{d}$ is equal to the recorded data $d_t$, as set forth below:

$$Lm = LM_tL_tm. \qquad \text{Eq. 22}$$

The inseparability measure $\epsilon$ may be defined based on Eq. 17 and is equal to the normalized norm of E. If, however, $M_t$ is computed with the constraint that $m_1 = m_2$, then the estimated and recorded data are similar only when this constraint is met; and the inseparability measure $\epsilon$ is large. If a requirement is made that the estimated and recorded data are equal only when $m_1 = m_2$, then the following requirement is imposed:

$$L(M_tL_t - I) \begin{pmatrix} m_1 \\ m_2 \end{pmatrix} = 0, \qquad \text{Eq. 23}$$

for all $m_1$, or equivalently:

$$E_c \equiv E \begin{pmatrix} I \\ I \end{pmatrix} = 0, \qquad \text{Eq. 24}$$

where "$E_c$" represents the constrained equivalent of E. The normalized norm of $E_c$, called "$\epsilon_c$," is smaller than $\epsilon$ by an amount that corresponds to the increase in separability that can be achieved as a result of constraining the models in the ideal case that the models are actually equal. The observed increase in separability depends on the similarity between the models.

Figure 17:
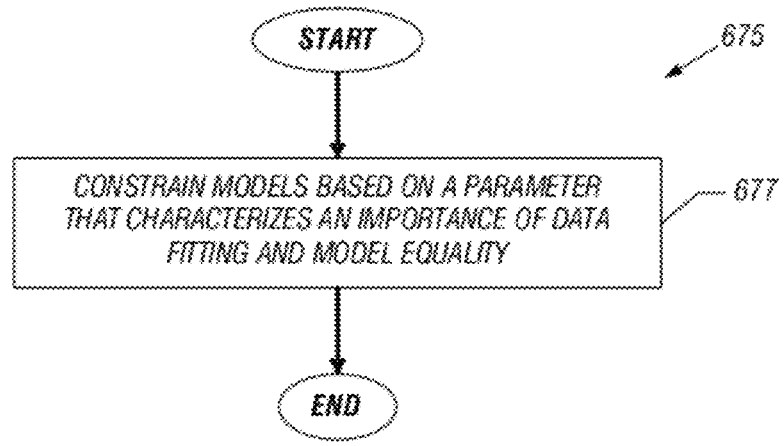
Figure 18:
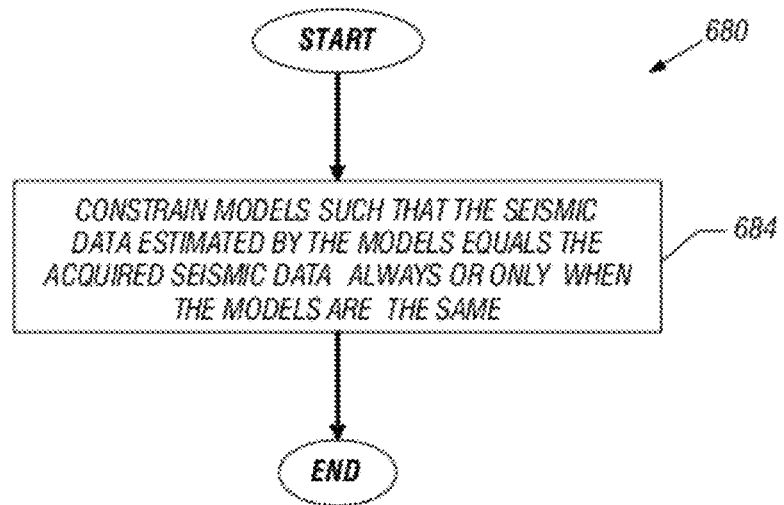

Referring to FIG. 17, to summarize, in accordance with embodiments of the invention, a technique 675 includes constraining (block 677) models based on a parameter that characterizes an importance of data fitting and model equality. Referring to FIG. 18, in accordance with some embodiments of the invention, the constraint of the models 18 may be performed pursuant to a technique 680. The technique 680 includes constraining (block 684) the model such that the seismic data estimated by the models equals the acquired seismic data always or only when the models are the same. Other variations are contemplated and are within the scope of the appended claims.

Constraints may also be added to different data gathers for the same source for purposes of reducing the effects of aliasing. These constraints may be imposed with or in lieu of the model constraints. As a specific example, the constraints may be applied to offset gathers (each of which is associated with a particular trace), which may otherwise be treated as independent. However, treating the offset gathers as being independent ignores the common information that is acquired by other traces. More specifically, the wavefield resulting from a particular shot varies slowly with respect to shot location, i.e., the wavefield is a continuous function of shot position. Thus, for multiple shots, small changes in shot position bring about corresponding small changes in the measured wavefield. The continuity of these measurements is attributable to features that are common to all measurements: the underlying geology, platform noise, etc. Therefore, based on this recognition, constraints between data gathers may be added for purposes of reducing aliasing effects in simultaneous source separation.

As a non-limiting example, constraints may be added to offset gathers. More specifically, the acquired seismic data may include N common offset planes for the $S_1$ source. The $S_1$ and $S_2$ sources move together so that there are also N common (but different) offset planes for the $S_2$ source. The offset planes for the sources may be modeled as follows:

$$m_1 = \begin{pmatrix} m_{11} \\ \vdots \\ m_{1N} \end{pmatrix}, \text{ and} \qquad \text{Eq. 25}$$

$$m_2 = \begin{pmatrix} m_{21} \\ \vdots \\ m_{2N} \end{pmatrix}, \qquad \text{Eq. 26}$$

where the first suffix denotes the model, and the second suffix denotes the offset plane. The models are expected to be similar for similar offsets (within each source model), such that a constrained system may be formulated as follows:

$$\begin{pmatrix} L_1 & & & L_2 & & \\ \lambda_{112} & -\lambda_{112} & \ldots & 0 & 0 & \ldots & 0 \\ \vdots & \vdots & \ddots & \vdots & \vdots & \vdots & \vdots \end{pmatrix} \begin{pmatrix} m_{11} \\ m_{12} \\ \vdots \\ m_{1N} \\ m_{21} \\ \vdots \\ m_{2N} \end{pmatrix} = \begin{pmatrix} d_t \\ 0 \\ \vdots \end{pmatrix}, \qquad \text{Eq. 27}$$

where "$\lambda_{sij}$" (where "s," is the source index, "i" is the first offset index and "j" is the second offset index) represents the strength of the constraint between $m_{si}$ and $m_{sj}$, and as many constraints may be added as desired. Typically, $\lambda_{sij}$ decreases as a difference between i and j increases.

Although a specific example is set forth herein for constraining offset gathers, constraints may likewise be applied to other types of gathers, such as common receiver gathers, common midpoint gathers, etc.

Referring to FIG. 19, in accordance with some embodiments of the invention, a seismic data processing system 720 may perform at least some of the techniques that are disclosed herein for purposes of separating seismic data acquired with energy that is produced by interfering seismic sources. In accordance with some embodiments of the invention, the system 720 may include a processor 750, such as one or more microprocessors and/or microcontrollers. The processor 750 may be located on a streamer 30 (FIG. 1), located on the vessel 20 or located at a land-based processing facility (as examples), depending on the particular embodiment of the invention.

The processor 750 may be coupled to a communication interface 760 for purposes of receiving seismic data that corresponds to pressure and/or particle motion measurements from the seismic sensors 58. Thus, in accordance with embodiments of the invention described herein, the processor 750, when executing instructions stored in a memory of the seismic data processing system 720, may receive multi-component data and/or pressure sensor data that are acquired by seismic sensors while in tow. It is noted that, depending on the particular embodiment of the invention, the data may be data that are directly received from the sensors as the data are being acquired (for the case in which the processor 750 is part of the survey system, such as part of the vessel or streamer) or may be sensor data that were previously acquired by seismic sensors while in tow and stored and communicated to the processor 750, which may be in a land-based facility, for example.

As examples, the interface 760 may be a USB serial bus interface, a network interface, a removable media (such as a flash card, CD-ROM, etc.) interface or a magnetic storage interface (IDE or SCSI interfaces, as examples). Thus, the interface 760 may take on numerous forms, depending on the particular embodiment of the invention.

In accordance with some embodiments of the invention, the interface 760 may be coupled to a memory 740 of the seismic data processing system 720 and may store, for example, various input and/or output datasets involved with processing the seismic data for purposes of source separation in connection with the techniques 110, 150, 250, 300, 330 and 340, as indicated by reference numeral 748. The memory 740 may store program instructions 744, which when executed by the processor 750, may cause the processor 750 to perform various tasks of or more of the techniques that are disclosed herein, such as the techniques 110, 150, 250, 650, 675 and/or 680, and display results obtained via the technique(s) on a display 772 that is coupled to the system 720 by a display interface 770, in accordance with some embodiments of the invention.

The system 720 may be also used for purposes of performing at least some parts of one or more of the techniques that are disclosed herein for purposes of optimizing a seismic survey for source separation, including determining a measure of inseparability and, in general, performing at least some parts of the techniques 450, 550 and/or 600 and implement one or more components of the system 500. Thus, the interface 760 may, for example, receive data indicative of firing times, linear operators, source models, etc., pursuant to the techniques that are disclosed herein for survey optimization; and the processor 750 may determine optimal survey parameters based on this data.

Other embodiments are within the scope of the appended claims. For example, in accordance with other embodiments of the invention, "amplitude dithering" may be used to aid separation. Although control of the amplitude of a towed seismic source may, in general, be challenging, in accordance with embodiments of the invention, the seismic sources may be controlled by deliberately not firing selected seismic sources according to some random or regular pattern. As another example, the amplitude dithering may include selectively firing some source elements (such as guns, for example) of a particular source while not firing other elements of the source to vary the amplitude.

Information regarding the amplitude dithering may be incorporated into the above-described linear operators.

In practice, occasionally one of the seismic sources may fail to fire. When this occurs, the information regarding the failed seismic source may be included into the associated linear operator by forcing the operator to have zero output for the corresponding trace. These misfires, in turn, may make the different seismic sources easier to separate.

As another example of a variation, the inseparability matrix E is derived above based on the fact that, if the separation is to be perfect, then E=0. However, alternatively, the separation for a particular source S may be required to be perfect. Based on this requirement, the corresponding rows of E need to be zero. E has $n_x \cdot n_s$ rows, where "$n_x$" and "$n_s$" are the number of traces (size of the recorded data vector, $d_r$) and the number of sources, respectively. The first $n_x$ rows correspond to source $S_1$, the next $n_x$ rows correspond to source $S_2$, etc. Therefore, an inseparability for each source may be defined as being the norm of the corresponding rows of E. As an example, Eq. 18 may be redefined as follows:

$$\epsilon_s = \|E_s\|_2 / \|L\|_2, \quad \text{Eq. 28}$$

where the suffix "s" represents the source number, and "$E_s$" represents the matrix formed from the rows of E corresponding to source S. With this definition, the following applies:

$$\varepsilon^2 = \sum_s \varepsilon_s^2. \quad \text{Eq. 29}$$

Thus, the overall inseparability is related to the individual inseparabilities for each source. This observation may not be very useful when there are only two sources, because in that case, the inseparabilities for the two sources will generally be equal. However, when there are more than two sources, the inseparabilities are not all be equal, and that may provide useful information for survey design. For example, if two of the sources use the same dither pattern, then the inseparabilites for these source are relatively high because the recorded data cannot be separated from each other. However, the inseparabilities for the other sources may still be low.

As another example of another embodiment of the invention, although a towed marine-based seismic acquisition system has been described above, the techniques and systems described herein for separating seismic signals produced by interfering seismic sources may likewise be applied to other types of seismic acquisition systems. As non-limiting examples, the techniques and system that are described herein may be applied to seabed, borehole and land-based seismic acquisition systems. Thus, the seismic sensors and sources may be stationary or may be towed, depending on the particular embodiment of the invention. As other examples of other embodiments of the invention, the seismic sensors may be multi-component sensors that acquire measurements of particle motion and pressure, or alternatively the seismic sensors may be hydrophones only, which acquire pressure measurements. Thus, many variations are contemplated and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
obtaining seismic data acquired by seismic sensors of a composite seismic signal produced by the firings of multiple seismic sources;
modeling the seismic data based at least in part on models for the sources and linear operators;
defining at least one constraint specifying an interdependency between at least two of the models, wherein the at least two models are different;
jointly determining the models based at least in part on the modeling and the at least one constraint; and
based at least in part on the determined models, generating a dataset representing a component of the composite seismic signal attributable to one of the seismic sources.

2. The method of claim 1, wherein the act of jointly determining comprises jointly inverting a function for the models.

3. The method of claim 1, wherein the seismic sources are fired simultaneously.

4. A method comprising:
obtaining seismic data acquired by seismic sensors of a composite seismic signal produced by the firings of multiple seismic sources;
for at least one of the seismic sources, defining a source model for a plurality of data gathers;
modeling the seismic data based at least in part on the source model and at least one linear operator;
for the at least one seismic source, defining at least one constraint specifying a relationship of at least two of the data gathers relative to each other;
jointly determining the source model based at least in part on the modeling and the at least one constraint; and
based at least in part on the determined source model, generating a dataset representing a component of the composite seismic signal attributable to one of the seismic sources.

5. The method of claim 4, wherein the act of jointly determining comprises jointly inverting the function for the model.

6. The method of claim 4, wherein the data gathers comprise common offset gather, common receiver gathers or common midpoint gathers.

7. The method of claim 4, wherein the act of defining the at least one constraint is based at least in part on a continuity of the gathers due to at least one feature common to the gathers.

8. The method of claim 7, wherein said at least one feature comprises a geological feature or platform-generated noise.

9. A method comprising:
determining at least one characterizing parameter of a seismic survey in which multiple seismic sources are fired and seismic sensors sense energy produced by the seismic sources,
wherein determining the at least one characterizing parameter comprises:
designing the seismic survey for separation of the sensed energy according to the seismic sources based at least in part on an inseparability measure determined at least in part on:
a first modeling operator applied to derive an estimate of seismic data sensed by the seismic sensors; and
a second modeling operator applied to separate the seismic data sensed by the sensors according to the seismic sources.

10. The method of claim 9, further comprising:
determining the measure of inseparability based at least in part on an estimated inverse of the first modeling operator, the first modeling operator and the second modeling operator.

11. A system comprising:
an interface to receive seismic data acquired by seismic sensors of a composite seismic signal produced by the firings of multiple seismic sources; and
a processor to process the seismic data to:
model the seismic data based at least in part on models for the sources and linear operators;
jointly determine the models based at least in part on the modeling and at least one constraint specifying an interdependency between at least two of the models, wherein the at least two models are different; and
based at least in part on the determined models, generate a dataset representing a component of the composite seismic signal attributable to one of the seismic sources.

12. The system of claim 11, wherein the processor is adapted to process the seismic data to jointly invert the function for the models.

13. The system of claim 11, wherein the seismic sources are fired simultaneously.

14. The system of claim 11, wherein the processor is adapted to process the second data based on a parameter that controls a data fitting and equality of the models.

15. A system comprising:
an interface to receive seismic data acquired by seismic sensors of a composite seismic signal produced by the firings of multiple seismic sources; and
a processor to process the seismic data to:
for at least one of the seismic sources, determine a source model for a plurality of data gathers;
model the seismic data based at least in part on the source model and at least one linear operator;
jointly determine the source model based at least in part on the modeling and at least one constraint specifying a relationship of at least two of the data gathers relative to each other; and
based at least in part on the determined source model, generate a dataset representing a component of the composite seismic signal attributable to one of the seismic sources.

16. The system of claim 15, wherein the data gathers comprise common offset gather, common receiver gathers or common midpoint gathers.

17. The system of claim 16, wherein the gathers are continuous due to at least one feature shared in common with the gathers.

18. A system comprising:
an interface to receive data representing a first modeling operator applied to derive an estimated seismic data sensed by seismic sensors and a second modeling operator applied to separate the seismic data sensed by the sensors according to seismic sources that are fired to produce the seismic data; and
a processor to process the data to determine a seismic survey for separation of the sensed energy according to the seismic sources based at least in part on an inseparability measure determined based at least in part on the first modeling operator and the second modeling operator.

19. The system of claim 18, wherein said at least one feature comprises a geological feature or platform-generated noise.

20. The system of claim 18, wherein the processor is adapted to determine the measure of inseparability based at least in part on an estimated inverse of the first modeling operator, the first modeling operator and the second modeling operator.

* * * * *